United States Patent [19]
Nagasawa et al.

[11] Patent Number: 4,802,031
[45] Date of Patent: Jan. 31, 1989

[54] TRACKING CONTROL USING SIGNALS REPRODUCED BY ERASE HEAD

[75] Inventors: Kenichi Nagasawa; Hiroyuki Takimoto; Mitsuhiro Otokawa, all of Kanagawa; Hiroo Edakubo, Tokyo; Susumu Kozuki, Tokyo; Keiji Satoh, Tokyo, all of Japan

[73] Assignee: Canon Kabushiki Kaisha, Tokyo, Japan

[21] Appl. No.: 875,330

[22] Filed: Jun. 17, 1986

[30] Foreign Application Priority Data

Jun. 19, 1985 [JP] Japan .............................. 60-133532
Jun. 19, 1985 [JP] Japan .............................. 60-133533

[51] Int. Cl.$^4$ ............................................. G11B 5/584
[52] U.S. Cl. .................................. 360/77.15; 360/107
[58] Field of Search ...................... 360/70, 71, 73, 75, 360/77, 13, 14.1, 14.2, 27, 57, 107

[56] References Cited

U.S. PATENT DOCUMENTS 4,188,646 2/1980 Sordello ................................ 360/77
4,520,405 5/1985 Sasaki et al. ...................... 360/10.3
4,607,298 8/1986 Yamashita ............................ 360/73

FOREIGN PATENT DOCUMENTS

53-96805 8/1978 Japan .................................. 360/77
59-117745 7/1984 Japan .................................. 360/73

Primary Examiner—Raymond F. Cardillo
Assistant Examiner—David L. Robertson
Attorney, Agent, or Firm—Robin, Blecker & Daley

[57] ABSTRACT

There is disclosed an information signal reproducing apparatus for reproducing information signals from a magnetic record bearing medium on which information signals are recorded with pilot signals of four different frequencies recurrently superimposed thereon. The apparatus comprises magnetic heads which are arranged to reproduce said information signals and said pilot signals by tracing said magnetic record bearing medium and an erasing head which is arranged to trace said magnetic record bearing medium in equal tracing direction to that of said magnetic heads and which is able to erase at least the information signals recorded on said magnetic record bearing medium and to reproduce said pilot signals. At the time of controlling a tracing position of said magnetic heads relative to said magnetic record bearing medium, four local pilot signals having the same frequencies as those of said pilot signals, respectively, are recurrently generated in a predetermined rotation. The state of said pilot signals reproduced by said magnetic heads is monitored, using said four local pilot signals and the tracing position on said medium of said magnetic heads is controlled, depending upon the state of said pilot signals. The level of a specific pilot signal from among said pilot signals reproduced by said erasing head is detected and the generating sequence of the local pilot signals is changed over, depending upon a result of such detention. According to such construction it is possible to effect the tracking control with high precision and high response speed.

10 Claims, 6 Drawing Sheets

TRACKING CONTROL USING SIGNALS REPRODUCED BY ERASE HEAD

BACKGROUND OF THE INVENTION

1. Field of the Invention

This invention relates to an information signal reproducing apparatus and more particularly to an apparatus for reproducing information signals from a recording medium on which pilot signals of different frequencies are recurrently superimposed in rotation on the information signals.

2. Description of the Related Art

Figure 1:
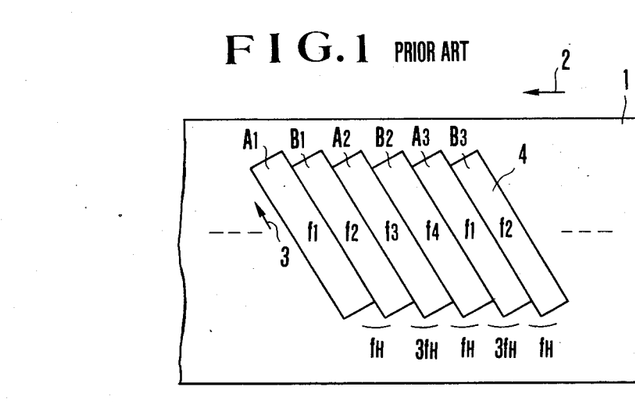
FIG. 1 is an illustration of a recording pattern on a magnetic tape resulting from recording by the conventional VTR.
Figure 2:
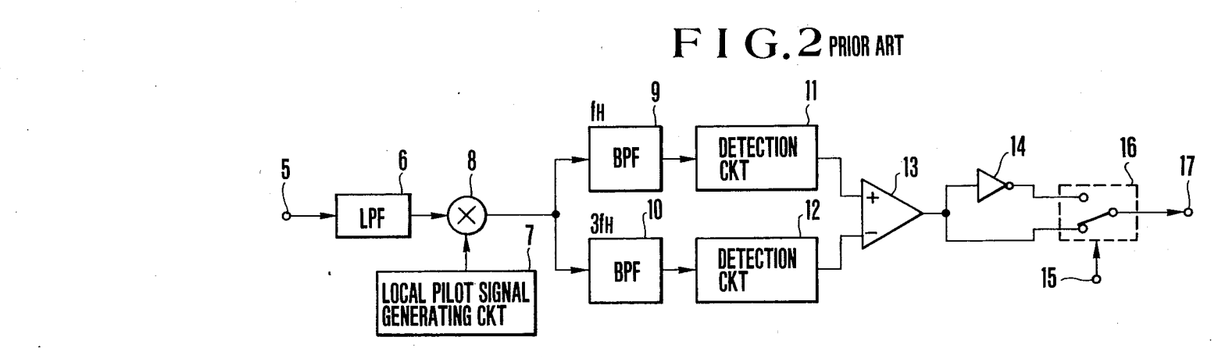
FIG. 2 is a diagram showing the tracking control signal processing circuit of the conventional VTR.

In the field of high density magnetic recording which typically includes the video tape recorder (hereinafter referred to as VTR), it has recently come to be popularly practiced to have pilot signals of four different frequencies superimposed on information signals during recording and to carry out tracking control by using the pilot signals reproduced during reproduction of the information signals. The conventional signal processing operation which has been performed to obtain signals for tracking control is as briefly described below:

FIG. 1 of the accompanying drawings shows the tracks of recording magnetization formed on a magnetic record bearing medium by a VTR which is arranged to perform tracking control in the four-frequency method. FIG. 2 is a diagram showing the essential parts of a reproducing circuit arranged to obtain a tracking error signal. In FIG. 1, an arrow 2 indicates the travelling direction of a magnetic tape 1. Magnetic heads A and B which have a given azimuth angle are arranged to form recording tracks A1, B1, A2, B2 and so on. Another arrow 3 indicates the direction in which these heads perform a scanning action. In each of recording tracks 4, one of pilot signals of four different frequencies f1 to f4 is recorded together with the video signal for every field, that is, in each of the tracks one after another.

The sequence of rotation in which these pilot signals are recorded is as shown in FIG. 1. For example, the pilot signal of frequency f1 which is 102.5 KHz≈6.5 fH is superimposed on the video signal in the track A1; the pilot signal of frequency f1 which is 118.9 KHz≈7.5 fH in the track B1; the pilot signal of frequency f3 which is 165.2 KHz≈10.5 fH in the track A2; and the pilot signal of frequency f4 which is 148.7 KHz≈9.5 fH in the track B2 (fH: the frequency of horizontal synchronizing signal).

The frequency difference between the pilot signals recorded in adjacent recording tracks is either fH or 3 fH as shown in FIG. 1. When the head is scanning the recording tracks Ai (wherein "i" represents 1, 2, 3 and so on), the frequency difference of the pilot signal of the scanning track (the main scanning track) is always fH from that of the track on the right-hand side as viewed on FIG. 1 and is always 3 fH from that of the left-hand track. Further, when the head is scanning the recording tracks Bi ("i": 1, 2, 3, ...), the frequency difference of the pilot signal of the scanning track is always 3 fH from that of the right-hand track and is always fH from that of the left-hand track.

Since all the pilot signals (of frequencies) f1 to f4 have relatively low frequency values, the head can reproduce, as cross-talk, the pilot signals from tracks located adjacent to a track mainly scanned or traced. For example, when the head is mainly scanning the track A2, the pilot signal thus detected (or reproduced) is a composite signal consisting of the frequency components f4, f2 and f3 representing these pilot signals. In case that the head is in a so-called on-track state with the center of the tracing locus of the head precisely coinciding with the center line of the main scanning track, the pilot signals f2 and f4 of the two adjacent tracks are at the same level. The reproduced level of the pilot signal f4 becomes higher than that of the pilot signal f2 when the head slightly deviates from the center line of the track A2 toward the track B2. The reproduced level of the pilot signal f2 becomes higher than that of the pilot signal f4 when the head slightly deviates toward the track B1.

Therefore, the direction and extent of deviation of the head from the main scanning track are obtainable by separately taking out difference signals fH and 3 fH representing differences between the pilot signal of the main scanning track and the pilot signals of the two adjacent tracks respectively and by comparing the levels of the difference signals thus obtained with each other.

FIG. 2 shows in a block diagram a circuit of the above-stated four-frequency method. A terminal 5 is arranged to receive a reproduced signal in which the pilot signals are superimposed on the video signal. A low-pass filter (hereinafter referred to as LPF) 6 is arranged to separate the pilot signal component from the reproduced signal. A local pilot signal generating circuit 7 is arranged to generate local pilot signals. A multiplier 8 is arranged to perform a multiplying operation on the pilot signal component and the local pilot signal generated by the generating circuit 7. The local pilot signal is of the same frequency as that of the pilot signal recorded on the main scanning track. As mentioned with reference to FIG. 1 in the foregoing, assuming that the main scanning track is the track A2, the output of the LPF 6 includes frequency components f2, f4 and f3. Meanwhile, the local pilot signal is of the frequency f3. Therefore, the multiplier 8 produces a signal of a frequency representing the sum of and a difference between the frequency f3 and the frequencies f2, f4 and f3. A band-pass filter (hereinafter referred to as BPF) 9 is arranged to take out only a signal of fH from the sum and difference signal while another BPF 10 is arranged to take out only a signal of 3 fH from the sum and difference signal. The outputs of the BPF's 9 and 10 are detected and rectified by detection circuits 11 and 12 respectively. Following that, the signal components fH and 3 fH thus obtained are supplied to a level comparison circuit 13. The circuit 13 then produces a signal corresponding to a level difference between these signal components. More specifically, in case where the reproduced level of the signal of the frequency fH is higher than that of the signal of the frequency 3fH, the output of the circuit 13 is of a positive potential corresponding to the level difference. In the event of a case opposite to that, the output of the circuit 13 is of a negative potential. The signal produced from the level comparison circuit 13 can be used as a tracking error signal as it contains information on the extent and direction of the deviation of head from the track.

As apparent from the foregoing description given with reference to FIG. 1, the deviating direction of the head from the tracks Ai is opposite to the deviating direction from the tracks Bi. Therefore, a switching circuit 16 is arranged to selectively produce the output of the level comparison circuit 13 either directly or through an inverting amplifier 14 according to a head change-over signal 15.

While tracking control can be adequately accomplished for reproduction of a video signal under a normal condition, let us consider now a tracking signal processing operation under a transient condition. With the main scanning track assumed to be the track A2 (see FIG. 1) in the beginning of reproduction and the local pilot signal component used for the multiplication process assumed to be of the frequency f1, the detection circuits 11 and 12 respectively produces the frequency components fH and 3 fH in the manner similar to the tracking control under the normal condition. In this instance, however, the tracking control is performed in such a manner as to cause the reproducing head to further deviate from the track A2 because the polarity obtained in this instance is opposite to the polarity obtained under the normal condition. Then, the pilot signal recorded in the main scanning track and the local pilot signal eventually come to coincide with each other.

However, with the levels of the components fH and 3 fH becoming about the same while the reproducing head is justly tracing the track A2, when the reproducing head is shifted either in the direction of arrow 2 or in the direction opposite thereto, a considerably long period of time is also required before the pilot signal of the main scanning track and the local pilot signal come to coincide with each other. Therefore, the conventional circuit arrangement has presented a problem that, during the above-stated long period of time, the quality of the reproduced picture tends to degrade. Further, in accordance with the conventional method described, the level difference between the pilot signals which are for example f2 and f4 and recorded in the two adjacent tracks B1 and B2 with the track A2 assumed to be mainly scanned or traced, is arranged to be detected in obtaining the tracking error signal. However, since the pilot signals f2 and f4 are reproduced as cross-talk and thus do not have any dynamic range, they are poor in the S/N ratio. Thus, it has been impossible to carry out tracking control with a sufficient degree of accuracy.

SUMMARY OF THE INVENTION

It is a general object of this invention to solve the problems mentioned in the foregoing with simple arrangement.

It is a specific object of this invention to provide an information signal reproducing apparatus which is capable of performing tracking control with quick retraction time without necessitating complex arrangement.

It is another specific object of this invention to provide an information signal reproducing apparatus which is capable of performing tracking control with an adequate degree of accuracy with simple arrangement.

Under this object, an information signal reproducing apparatus arranged according to this invention as an embodiment thereof to reproduce information signals which are recorded in recording tracks formed on a magnetic record bearing medium in the direction of crossing the travelling direction of the medium at a given pitch with pilot signals of different frequencies recurrently superimposed in rotation on the information signals comprises: magnetic heads arranged to reproduce at least the information signals by tracing the recording tracks on the medium in the track forming direction; means for causing the medium tracing action of the heads; an erasing head arranged to erase the information signals recorded on the medium by tracing the recording tracks in the same direction as the magnetic heads and to be capable of reproducing the pilot signals; and tracking control means arranged to control the tracing position on the medium of the magnetic heads by controlling the medium tracing action causing means at least according to the pilot signals reproduced by the erasing head.

It is a further object of this invention to provide an information signal reproducing apparatus which is capable of promptly bringing tracking control from a transient state into a normal state.

It is a still further object of this invention to provide an information signal reproducing apparatus which is capable of obtaining a satisfactorily reproduced signal even at the beginning of a reproducing operation.

Under this object, an information signal reproducing apparatus arranged as another embodiment of this invention to reproduce information signals which are recorded on a magnetic record bearing medium with pilot signals of different frequencies recurrently superimposed in rotation on the information signals comprises: magnetic heads arranged to reproduce the information signals and the pilot signals by tracing the magnetic record bearing medium; means for causing the heads to trace the medium; an erasing head arranged to erase the information signals recorded on the medium by tracing the medium in the same direction as the magnetic heads and to be capable of reproducing the pilot signals; tracking control means arranged to control the tracing position on the medium of the magnetic heads by controlling, according to the state of the pilot signals reproduced by the magnetic heads, the means for causing the heads to trace the medium; level detecting means for detecting the level of a specific pilot signal from among the pilot signals reproduced by the erasing head; and switching means for switching the controlling state of the tracking control means from one state over to another according to the level of the specific pilot signal detected by the level detecting means.

The above and further objects and features of this invention will become apparent from the following detailed description of preferred embodiments thereof taken in connection with the accompanying drawings.

DETAILED DESCRIPTION OF THE PREFERRED EMBODIMENTS

Figure 3:
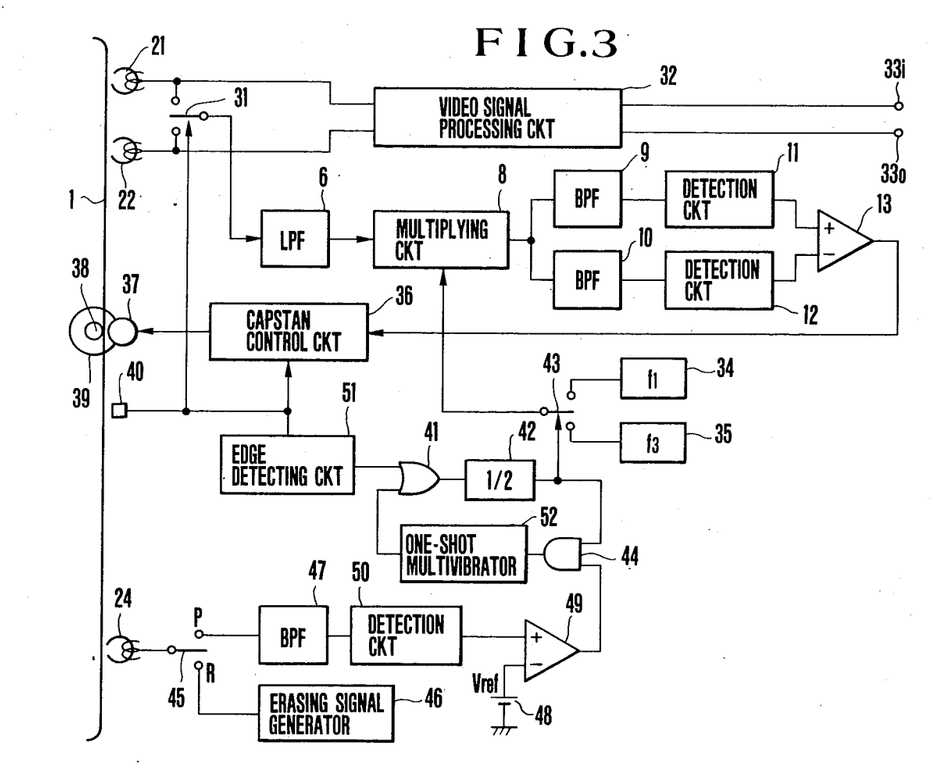
FIG. 3 is a diagram showing in outline the arrangement of a VTR arranged as an embodiment of this invention.
Figure 4:
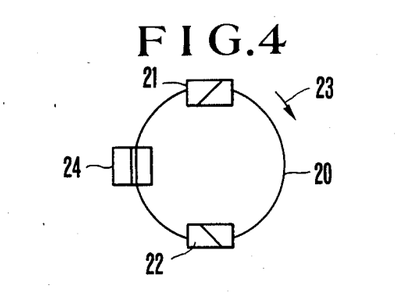
FIG. 4 is a schematic illustration of the allocation of the heads of the VTR shown in FIG. 3.
Figure 5:
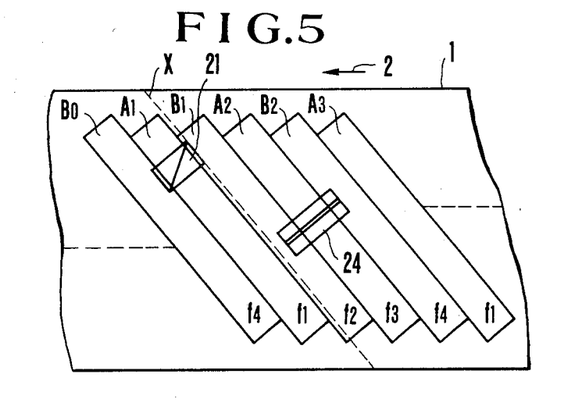
FIG. 5 is an illustration of a tracing operation performed by the VTR of FIG. 3 on a record bearing medium during reproduction.

The following is description of embodiments in which this invention is applied to VTR's: FIG. 3 shows in outline a VTR arranged as an embodiment of this invention. FIG. 4 shows the allocation of heads employed in the same VTR. FIG. 5 shows the state of the recording medium tracing action of the same VTR performed during a reproducing operation. As shown in FIG. 4, recording/reproducing heads 21 and 22 are mounted on a rotary cylinder or drum 20 with a phase difference of 180 degrees between them. A rotary erasing head 24 is mounted also on the cylinder 20 with a phase difference of 90 degrees from each of the heads 21 and 22. The erasing head 24 has a width measuring twice as wide as the width of each recording track. An arrow 23 indicates the rotating direction of these heads. The rotary erasing head 24 must precede the recording-/reproducing heads 21 and 22 in tracing the recording tracks. For example, when the head 21 is at a position as shown in FIG. 5, the head 24 is located at a position as shown in FIG. 5. Then, assuming that the reproducing head 21 is mainly scanning a track A1, the erasing head 24 begins to trace when the scanning or tracing action of the head 21 comes to the latter half of the tracing action on the track A1 and the tracing action of the head 24 on the track A1 comes to an end after the reproducing head 22 begins to mainly scan or trace another track B1. During this process, the pilot signal of the frequency f1 is not reproduced via the rotary erasing head 24. Whereas, in case that the main scanning track of the head 21 is the track A2 and that of the head 22 is another track B2, the erasing head 24 produces an output which contains a frequency component f1 to a great degree.

In view of this, this specific embodiment is arranged to determine the reproducing operation to be abnormal in the event that the frequency component f1 is reproduced from the rotary erasing head 24 while a recording track having the pilot signal frequency f1 or f2 is mainly scanned or traced by the reproducing head.

Figure 6:
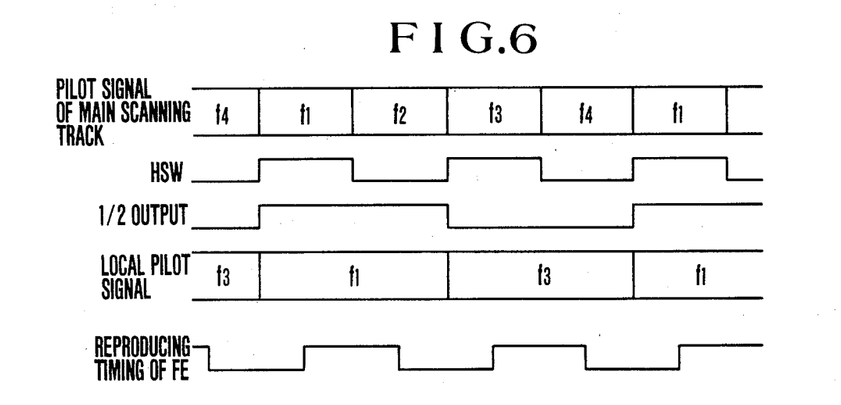
FIG. 6 is a timing chart showing the operation of various parts of the VTR shown in FIG. 3.

The following describes the operation of the various parts of FIG. 3 with reference to the timing chart of FIG. 6: In FIG. 3, the reference numerals used in FIGS. 2 and 4 are also used in indicating the corresponding parts. The recording/reproducing heads 21 and 22 are connected to a video signal processing circuit 32. A video signal coming via a terminal 33i is recorded. A reproduced video signal is produced via another terminal 33o. A rotation detector 40 is arranged to detect the rotation of a rotary drum (or cylinder) 20 and to produce a rectangular wave signal HSW one period of which represents one turn of the drum. The signal HSW is arranged to control a head switch 31. The output of the head switch 31 is subjected to a tracking signal processing operation which is performed at an LPF 6 and ensuing circuit elements. As a result, a tracking control signal is obtained from a differential amplifier 13. In this instance, the tracking control signal from the amplifier 13 is supplied directly to a capstan control circuit 36 without passing through an inverting amplifier. The output of the differential amplifier 13 is thus arranged to be used for tracking control only when the reproducing head is mainly scanning a recording track having the pilot signal frequency f1 or f3 according to the above-stated signal HSW. As for the local pilot signal, the local pilot signal of frequency f1 or f3 is employed and is selectively supplied via a switch 43 to a multiplying circuit 8.

A frequency divider 42 is arranged to frequency divide by ½ the signal HSW using the output of an edge detecting circuit 51. The connecting position of the switch 43 is shifted according to the output of this frequency divider 42. Referring to FIG. 6, when the pilot signal recorded in the main scanning track is of frequency f1 or f2, the local pilot signal f1 is used. The local pilot signal f3 is used when the pilot signal f3 or f4 is recorded in the main scanning track.

The switch 43 supplies the multiplying circuit 8 with the output of an f1 oscillator 34 when the output of the ½ frequency divider 42 is at a high level and with the output of an f3 oscillator 35 when the output of the ½ frequency divider 42 is at a low level. Such being the arrangement, if the output of the rotary erasing head 24 includes an f1 frequency component to an excessive degree when the output level of the ½ frequency divider is high, the reproducing operation is determined to be abnormal.

A switch 45 is arranged to make selection between recording and reproduction. The position of the switch 45 is on the side of a terminal R thereof when recording is performed by the heads 21 and 22 and is on the side of another terminal P when reproduction is performed. In recording, an erasing signal produced from an erasing signal generator 46 is supplied to the head 24. In response to this signal, the head 24 performs an erasing action. In the case of reproduction, the f1 frequency component of a reproduced signal produced via the terminal P of the switch 45 is separated by a band-pass filter (BPF) 47. The output of the BPF 47 is subjected to a detection process at a detection circuit 50. The detection output thus obtained is compared with a reference voltage (Vref) 48 at a comparator 49. When the output of the detection circuit 50 exceeds the reference voltage Vref, the output level of the comparator 49 becomes high. In this instance, if the output level of the ½ frequency divider 42 is high, there arises an abnormal condition as mentioned above. Then the level of the output of an AND gate 44 becomes high to trigger a one-shot multivibrator 52 to obtain a clock input of the ½ frequency divider 42. Accordingly, the output of the ½ frequency divider 42 is inverted and the switch 43 comes to produce the output f3 of the f3 oscillator 35. Since the reproducing head is tracing at that moment a track adjacent to a track in which the pilot signal f3 is superimposed on the video signal, tracking control is quickly brought or pulled back into a normal condition. In accordance with the arrangement of this embodiment described, the tracking control can be thus promptly brought into a normal condition even during the transient period after commencement of reproduction.

Further, in the embodiment described, the tracking control operation is determined to be abnormal when the rotary erasing head reproduces a large amount of the frequency component f1 while the main scanning track includes the pilot signal (of frequency) f1 or f2. However, this arrangement may be changed as desired by changing the allocation of the reproducing head and the rotary erasing head. Further, the tracking control may be accomplished according to the conventional method of generating the local pilot signals in rotation of frequencies f1, f2, f3 and f4. In that instance, the tracking control can be promptly brought into a normal condition by shifting the local pilot signal frequency in such a manner as f1→f3, f2→f4, f3→f1 and f4→f2.

The VTR arranged according to this invention as described above is capable of bringing its operation into a normal condition even in the transient period of the tracking control. Therefore, the VTR is capable of giving an adequately reproduced signal even in the beginning of a reproducing operation.

Figure 7:
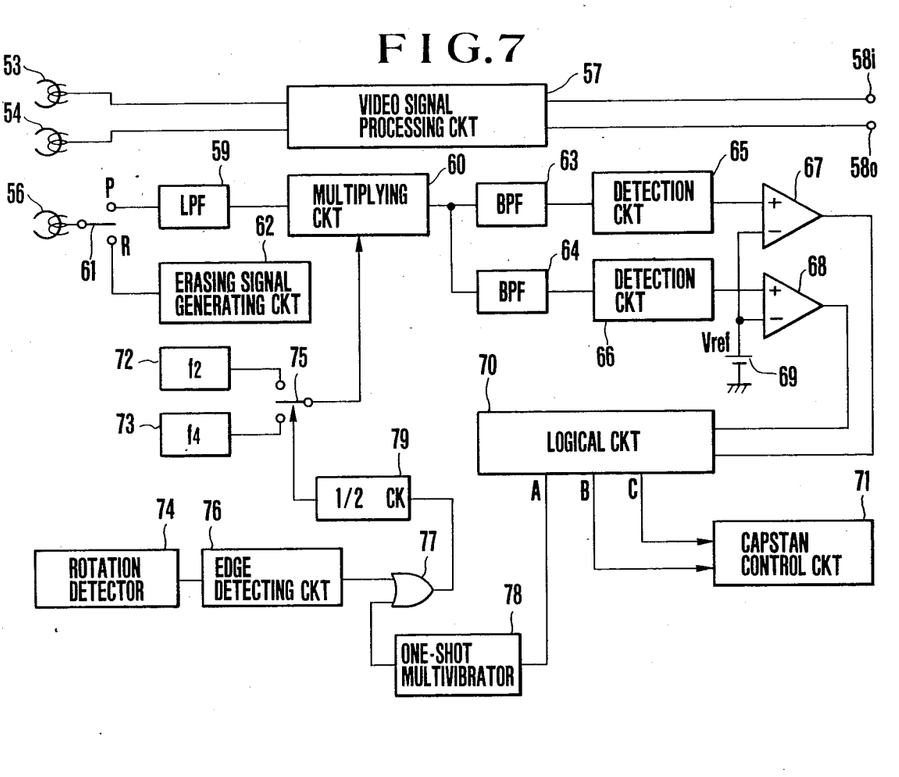
FIG. 7 is a diagram showing in outline the arrangement of a VTR arranged as another embodiment of this invention.
Figure 8:
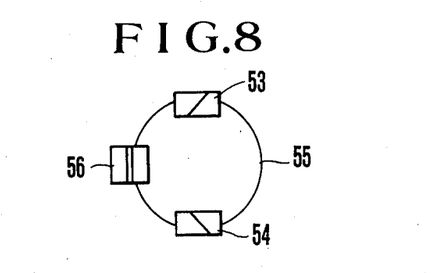
FIGS. 8 and 9 are illustrations of the head arrangement of the same VTR.
Figure 9:
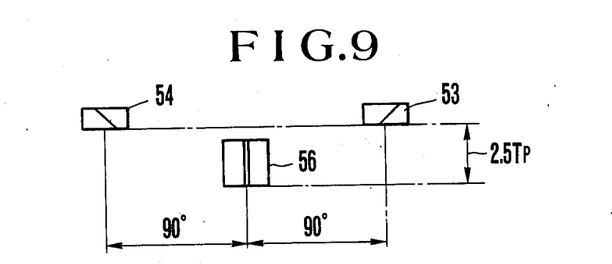
Figure 10:
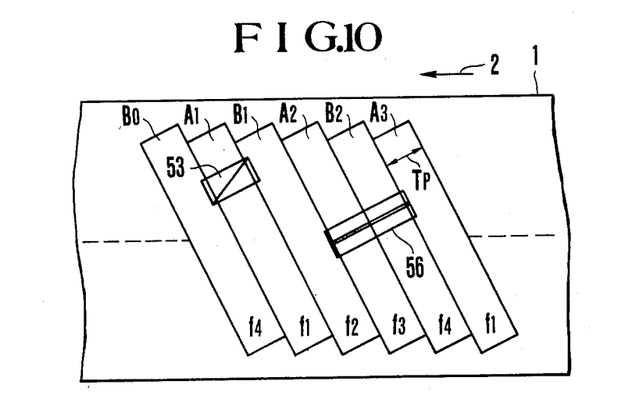
FIG. 10 is an illustration of a tracing action performed on a record bearing medium by the same VTR during reproduction.

FIG. 7 shows in outline the arrangement of a VTR as another embodiment of this invention. FIGS. 8 and 9 show the allocation of heads of the same VTR. FIG. 10 shows the tracing action of the heads performed on a record bearing medium during a reproducing operation. Referring to FIGS. 8 and 9, recording/reproducing heads 53 and 54 are mounted on a rotary drum 55 with a phase difference of 180 degrees between them. An erasing head 56 is mounted also on the drum 55 with a phase difference of 90 degrees from the heads 53 and 54. Further, assuming that the track pitch is Tp, the erasing head 56 is positioned on the rotary drum with its lower end shifted about 2.5 Tp. As a result, during recording and reproduction, the tracing position of the erasing head deviates to an extent corresponding to three tracks as shown in FIG. 10.

Figure 11:
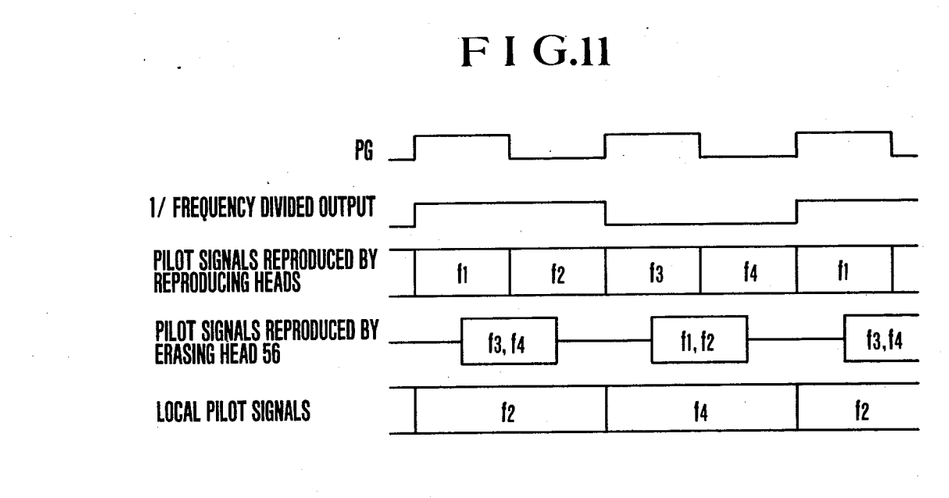
FIG. 11 is a timing chart showing the operation of the various parts of the same VTR.

Next, the principle of bringing or pulling the tracking control into a normal condition according to the arrangement of this embodiment is as follows: While the recording/reproducing heads are tracing the tracks in which the pilot signals f1 and f2 are superimposed on the video signal, the rotary erasing head 56 traces two tracks in which the pilot signals f3 and f4 are superimposed on the video signal as shown in FIG. 10. Further, conversely, the erasing head 56 simultaneously traces two tracks in which the pilot signals f1 and f2 are superimposed while the heads 53 and 54 are simultaneously tracing the tracks in which the pilot signals f3 and f4 are superimposed. FIG. 11 shows this mode of operation.

Assuming that the head 53 is in the tracing position as shown in FIG. 10, it is apparent that a tracking error signal can be obtained by comparing the frequency components f3 and f4 included in the output of the rotary erasing head 56. Further, while the heads 53 and 54 are tracing the tracks in which the pilot signals f3 and f4 are superimposed, a tracking error signal is also obtainable by comparing the frequency components f1 and f2 produced from the erasing head. However, arrangement to detect and process all of these frequency components necessitate a large circuit arrangement. To avoid it, therefore, the local pilot signal is arranged to be superimposed on the output of the erasing head 56 as shown in FIG. 11. By virtue of this arrangement, the frequency components f1 and f3 can be extracted as a 3 fH component and the frequency components f2 and f4 as a 2 fH component.

In this instance, if the local pilot signal is applied in a reverse manner, the 2 fH and 3 fH components would be generated in smaller quantities. This indicates an abnormal condition. In that event, therefore, the local pilot signals are switched over between signal frequencies f2 and f4. By this arrangement, the length of time required for pulling the tracking control into a normal condition can be shortened. The operation of each of the parts shown in FIG. 7 is as follows:

The signal reproduced by the recording/reproducing heads 53 and 54 is processed by a video signal processing circuit 57 into a signal form suited for television and is produced from a terminal 58o. Meanwhile, a video signal which comes via a terminal 58i is processed by the circuit 57 into a signal form suited for recording and is recorded by the heads 53 and 54 on a record bearing medium.

In recording, the output of an erasing signal generating circuit 62 is supplied as an erasing signal to the erasing head 56. In reproduction, the pilot signal component is separated by an LPF 59 from the output signal of the head 56 and is supplied to a multiplying circuit 60 to be subjected to a multiplying operation with the local pilot signal f2 or f4. A BPF 63 separates a 2 fH component from the output of the multiplying circuit 60. Another BPF 64 separates a 3 fH component from the output of the circuit 60. The outputs of these BPF's are respectively subjected to detection processes performed at detection circuits 65 and 66. The outputs of these detection circuits 65 and 66 are supplied to comparators 67 and 68 to be compared with a reference voltage 69. The outputs of the comparators 67 and 68 are supplied to a logical circuit 70. The reference voltage 69 (or Vref) is set at a value which is slightly lower than the level of the pilot signals to be reproduced from one Tp portion of the record bearing medium.

The heads are considered to be in an on-track state when output levels of both the comparators 67 and 68 are high. In that case, a capstan control circuit 71 is left in a state of merely performing speed control. In the event that the output of the comparator 67 is at a high level while that of the other comparator 68 is at a low level, the tracing position of the head is deviating in the direction reverse to the direction of arrow 2 of FIG. 10. In that event, the phase of a capstan is adjusted in such a way as to lower the travelling speed of the tape (or the record bearing medium). In this instance, the logical circuit 70 produces an output C as shown in FIG. 7.

When the output of the comparator 68 is at a high level while that of the comparator 67 is at a low level, the logical circuit 70 produces an output B. This signal causes the phase of the capstan adjusted to increase the travelling speed of the tape.

When the outputs of both the comparators 67 and 68 are at low levels, the logical circuit 70 produces an output A which indicates that the tracking control is in a transient state. The output A triggers a one-shot multivibrator 78 and a clock pulse signal is supplied via an OR gate 77 to a ½ frequency divider 79.

Under a normal condition, a rectangular wave signal which has one period thereof corresponding to one turn of a rotary drum 55 and is produced from a rotation detector 74 is supplied to an edge detecting circuit 76. The output of the circuit 76 is used as the above-stated clock pulse signal to be supplied to the ½ frequency divider 79. Following this, a switch 75 selectively supplies the local pilot signal f2 or f4 to the multiplying circuit 60. Accordingly, when the output A is produced from the logical circuit 70, the local pilot signal is switched over between the pilot signal frequencies f2 and f4, so that the tracking control can be instantly pulled into a normal condition.

In the embodiment described, the capstan control may be modified to be carried out by comparing the outputs of the detection circuits 65 and 66 with each other. Further, in the event that the erasing head 56 is arranged in a position which is further away from the recording/reproducing heads 53 and 54 by one track pitch (Tp) distance, the arrangement of the BPF's 63 and 64 must be changed to separate an fH component and a 2 fH component respectively.

As described in the foregoing, the VTR according to this invention is capable of promptly bringing (or pulling) the tracking control into a normal condition even in the event of a transient state, so that an adequately reproduced signal can be obtained without delay.

What is claimed is:

1. An information signal reproducing apparatus for reproducing information signals which are recorded on a magnetic record bearing medium with pilot signals of four different frequencies recurrently superimposed in rotation on said information signals, comprising:
   (a) magnetic heads arranged to reproduce said information signals and said pilot signals by tracing said magnetic record bearing medium;
   (b) medium tracing action causing means for causing said heads to trace said magnetic record bearing medium;
   (c) an erasing head arranged to erase said information signals recorded on said medium by tracing said medium in the same direction as said magnetic heads and to be capable of reproducing said pilot signal;
   (d) tracking control means arranged to control the tracing position on said medium of said magnetic heads by recurrently generating local pilot signals of the same four different frequencies as those of said pilot signals in rotation in a predetermined sequence, monitoring the state of said pilot signals reproduced by said magnetic heads, using said local pilot signals and controlling said medium tracing action causing means according to the state of said pilot signals;
   (e) level detecting means for detecting the level of a specific pilot signal from among said pilot signals reproduced by said erasing head; and
   (f) switching means arranged to change the generating sequence of the local pilot signals of said tracking control means according to the level of said specific pilot signal detected by said level detecting means.

2. An apparatus according to claim 1, wherein said erasing head is arranged to reproduce pilot signals of frequencies which differ from the frequencies of pilot signals to be reproduced by said magnetic heads.

3. An apparatus according to claim 2, wherein said erasing head is arranged to also trace said magnetic record bearing medium while said magnetic heads are tracing said medium.

4. An apparatus according to claim 3, further comprising a rotary member on which said magnetic heads and said erasing head are mounted and arranged at given spacing intervals along the circumference of said member.

5. An information signal reproducing apparatus for reproducing information signals which are recorded in recording tracks formed on a magnetic record bearing medium in the direction of crossing a travelling direction of said medium at a given pitch with pilot signals of four different frequencies recurrently superimposed in rotation on said information signals, comprising:
   (a) magnetic heads for reproducing said information signals by tracing said magnetic record bearing medium in the direction in which said recording tracks are formed;
   (b) medium tracing action causing means for causing said magnetic heads to trace said magnetic record bearing medium;
   (c) an erasing head arranged to erase at least said information signals recorded on said medium by tracing said medium in the same direction as said magnetic heads and to have the head width thereof measuring in the direction perpendicular to the medium tracing direction thereof approximately two times as much as the pitch at which said recording tracks are formed, said erasing head being capable of reproducing said pilot signals;
   (d) tracking control means arranged to control the tracing position on said medium of said magnetic heads by recurrently generating local pilot signals of the same four different frequencies as those of said pilot signals in rotation in a predetermined sequence, monitoring the state of said pilot signals reproduced by said magnetic heads, using said local pilot signals and controlling said medium tracing action causing means according to the state of said pilot signals;
   (e) level detecting means for detecting the levels of two pilot signals from among said pilot signals reproduced by said erasing head; and
   (f) switching means arranged to change the generating sequence of the local pilot signals of said tracking control means according to the levels of two pilot signals detected by said level detecting means.

6. An apparatus according to claim 5, wherein said erasing head is arranged to trace also said magnetic record bearing medium while said magnetic heads are tracing said medium.

7. An apparatus according to claim 6, further comprising a rotary member on which said magnetic head and said erasing heads are mounted and spaced at given intervals along the circumference of said rotary member.

8. An apparatus according to claim 7, wherein said erasing head and each of said magnetic heads are spaced at a distance approximately 2.5 times as much as the pitch of said recording tracks in the direction perpendicular to the rotating direction of said rotary member.

9. An apparatus according to claim 6, wherein said erasing head is arranged to trace different recording tracks from the recording tracks being traced by said magnetic heads while said magnetic heads are tracing said magnetic record bearing medium.

10. An apparatus according to claim 5, wherein said level detecting means is arranged to detect the levels of two different pilot signals which are recorded in two adjacent recording tracks formed on said magnetic record bearing medium.

* * * * *